US010680355B2

(12) United States Patent
Durse et al.

(10) Patent No.: US 10,680,355 B2
(45) Date of Patent: Jun. 9, 2020

(54) TERMINAL ASSEMBLY FOR SHIELDED CABLE

(71) Applicant: Aptiv Technologies Limited, St. Michael, OT (BB)

(72) Inventors: Nicholas A. Durse, Youngstown, OH (US); Thomas S. Huda, Youngstown, OH (US); Eric B. Poma, Hubbard, OH (US); Bruce D. Taylor, Cortland, OH (US)

(73) Assignee: Aptiv Technologies Limited (BB)

( * ) Notice: Subject to any disclaimer, the term of this patent is extended or adjusted under 35 U.S.C. 154(b) by 0 days.

(21) Appl. No.: 15/985,833

(22) Filed: May 22, 2018

(65) Prior Publication Data

US 2018/0277967 A1 Sep. 27, 2018

Related U.S. Application Data

(63) Continuation-in-part of application No. 15/007,272, filed on Jan. 27, 2016.

(60) Provisional application No. 62/528,651, filed on Jul. 5, 2017.

(51) Int. Cl.
*H02G 15/013* (2006.01)
*H01R 9/05* (2006.01)

(52) U.S. Cl.
CPC .................................. *H01R 9/0527* (2013.01)

(58) Field of Classification Search
CPC .................................................... H02G 15/013
USPC ........................................................ 174/74 R
See application file for complete search history.

(56) References Cited

U.S. PATENT DOCUMENTS 2,460,795 A 2/1949 Warrick
4,280,749 A 7/1981 Hemmer
4,453,798 A * 6/1984 Asick ................ H01R 13/6593 174/359
5,102,351 A 4/1992 Meshel
5,137,471 A * 8/1992 Verespej ............. H01R 9/0518 439/322
5,432,301 A 7/1995 Gehring
5,823,654 A 10/1998 Pastrick et al.
(Continued)

FOREIGN PATENT DOCUMENTS

CN 104813522 A 7/2015
EP 694989 B1 1/2001
(Continued)

*Primary Examiner* — Stanley Tso
(74) *Attorney, Agent, or Firm* — Robert J. Myers

(57) ABSTRACT

A terminal assembly is configured to terminate a shielded cable having an inner conductor, an inner insulator surrounding the inner conductor, an outer conductor surrounding the inner insulator, and an outer insulator surrounding the outer conductor. This terminal assembly includes a generally cylindrical outer ferrule formed of a plastic conductive material, i.e. a material that is deformed after stress is removed, and a generally cylindrical inner ferrule formed of an elastic dielectric material i.e. a material that recovers after stress is removed, having a plurality of circumferential grooves defined in an outer surface thereof. At least a portion of the inner ferrule is disposed within the outer ferrule. A portion of the outer conductor is disposed intermediate the inner ferrule and the outer ferrule and is in intimate contact therewith.

10 Claims, 15 Drawing Sheets

(56) References Cited

U.S. PATENT DOCUMENTS

| | | | | | |
|---|---|---|---|---|---|
| 5,854,444 | A * | 12/1998 | Fehlhaber | H02G 15/105 174/84 R |
| 6,107,572 | A | 8/2000 | Miyazaki | |
| 7,598,455 | B2 | 10/2009 | Gump et al. | |
| 2010/0186989 | A1 * | 7/2010 | Alvelo | H01B 7/18 174/113 R |
| 2011/0309613 | A1 * | 12/2011 | Trujillo | F16L 33/2073 285/256 |
| 2013/0029523 | A1 * | 1/2013 | Poma | H01R 4/20 439/585 |
| 2015/0303611 | A1 | 10/2015 | Iizuka | |
| 2017/0143404 | A1 * | 5/2017 | Hancock | A61B 18/12 |

FOREIGN PATENT DOCUMENTS

| | | | |
|---|---|---|---|
| EP | 1258952 | A1 | 11/2002 |
| EP | 3179563 | A1 | 6/2017 |
| FR | 1386812 | A | 1/1965 |
| JP | H0722089 | A | 1/1995 |
| JP | 2000-100525 | * | 4/2000 |
| JP | 2000100525 | A | 4/2000 |
| JP | 2004273247 | A | 9/2004 |
| JP | 2010160957 | A | 7/2010 |
| KR | 100907577 | B1 | 7/2009 |

* cited by examiner

TERMINAL ASSEMBLY FOR SHIELDED CABLE

CROSS REFERENCE TO RELATED APPLICATIONS

This application is a continuation-in-part application and claims the benefit under 35 U.S.C. § 120 of U.S. patent application Ser. No. 15/007,272 filed Jan. 27, 2016 and claims the benefit under 35 USC § 119(e) of U.S. Provisional Patent Application No. 62/528,651 filed on Jul. 5, 2017, the entire disclosure of each of which is hereby incorporated herein by reference.

TECHNICAL FIELD OF THE INVENTION

The invention relates to a terminal assembly for an electrically shielded wire cable, particularly a terminal assembly having a resiliently compressible inner ferrule.

BACKGROUND OF THE INVENTION

Braided shields of shielded cables are currently terminated by placing the braids of the shield between a metal inner and outer ferrule before crimping. An example of a terminal assembly using these ferrules is shown in FIGS. 1A-1D. The outer insulation of the cable 112 is first removed to expose the braided shield 118 and the braids of the shield are then flared and a metallic tubular inner ferrule 122 is placed between the braids 118 and the inner insulation 114 of the shielded cable 112 (see FIG. 1A). A metallic tubular outer ferrule 132 is placed over the braided shield 118 and inner ferrule 122 (see FIG. 1B) and then crimped 136 to secure the outer ferrule 132 to shielded cable 112 (see FIGS. 1C and 1D).

The difference between the inner diameter of the outer ferrule 132 and the outer diameter of the inner ferrule 122 is typically about 1 millimeter. Thick inner ferrules can degrade the strength of the crimp possibly reducing pull off force and increasing shield to outer ferrule electrical resistance. Thin inner ferrules can rupture during crimping. Rupture of the inner ferrule 122 could cause undesirable electrical contact and shorting of the inner conductor 114 and the braided shield 118. Therefore, the inner and outer ferrule diameters must be carefully matched and different cable sizes and applications require different sized inner and outer ferrules. The inner and outer ferrules are formed by either deep draw stamping or machining; both of these manufacturing methods are relatively expensive. These inner and outer ferrule sizes may differ only slightly for different shielded cables which may make it difficult to visually distinguish between different sized inner or outer ferrules. Applying markings, such as color coding, may be used to help identify different ferrules. However, applying these markings is an additional manufacturing process that undesirably increases ferrule manufacturing time and cost. Therefore, a reliable ferrule assembly that can easily accommodate different cable sizes remains desired.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

BRIEF DESCRIPTION OF THE SEVERAL VIEWS OF THE DRAWING

The present invention will now be described, by way of example with reference to the accompanying drawings, in which.

DETAILED DESCRIPTION OF THE INVENTION

Figure 1A:
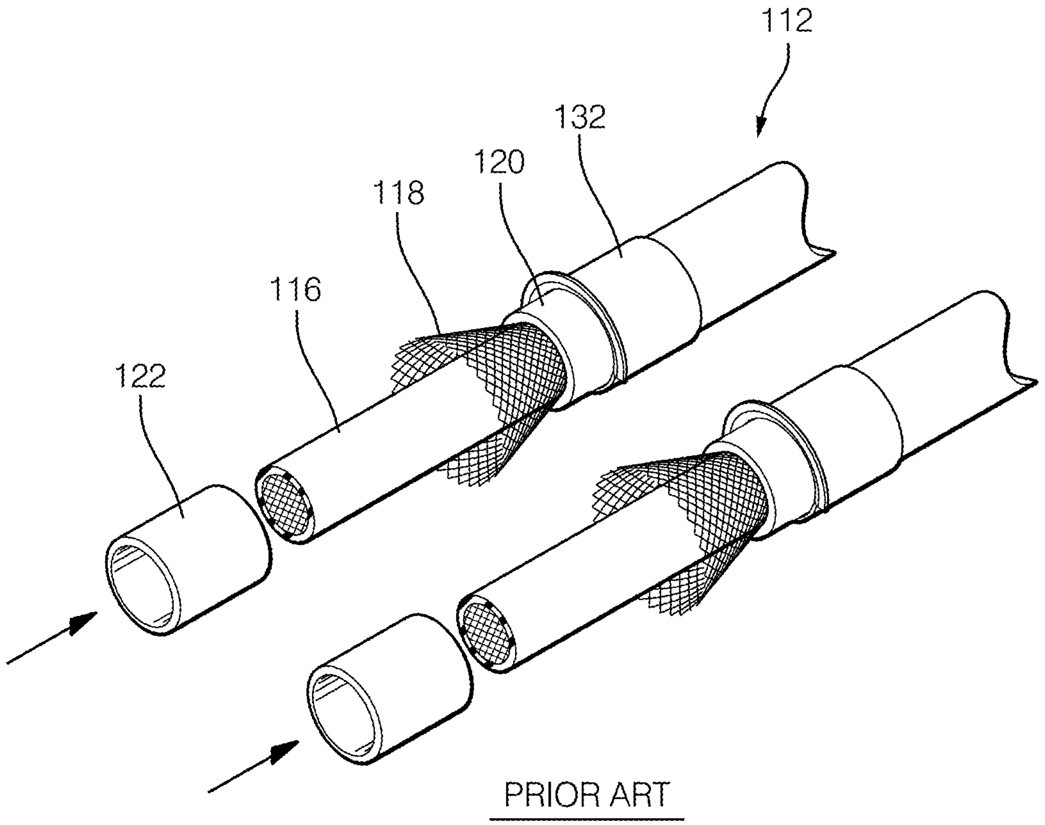
PRIOR ART FIG. 1A
FIGS. 1A-1D are perspective side views illustrating a method of forming a terminal assembly having a metallic inner and outer ferrule according to the prior art.
Figure 1B:
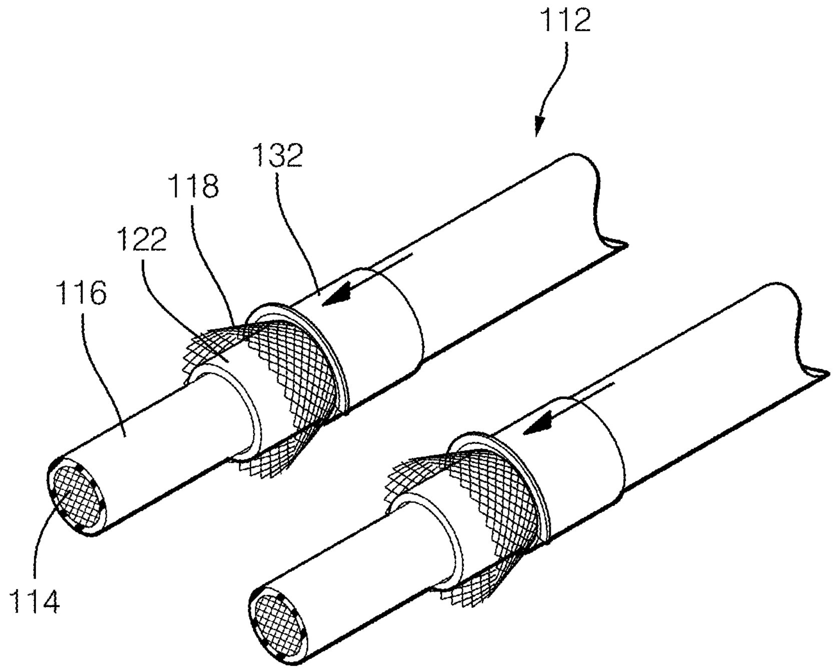
PRIOR ART FIG. 1B
Figure 1C:
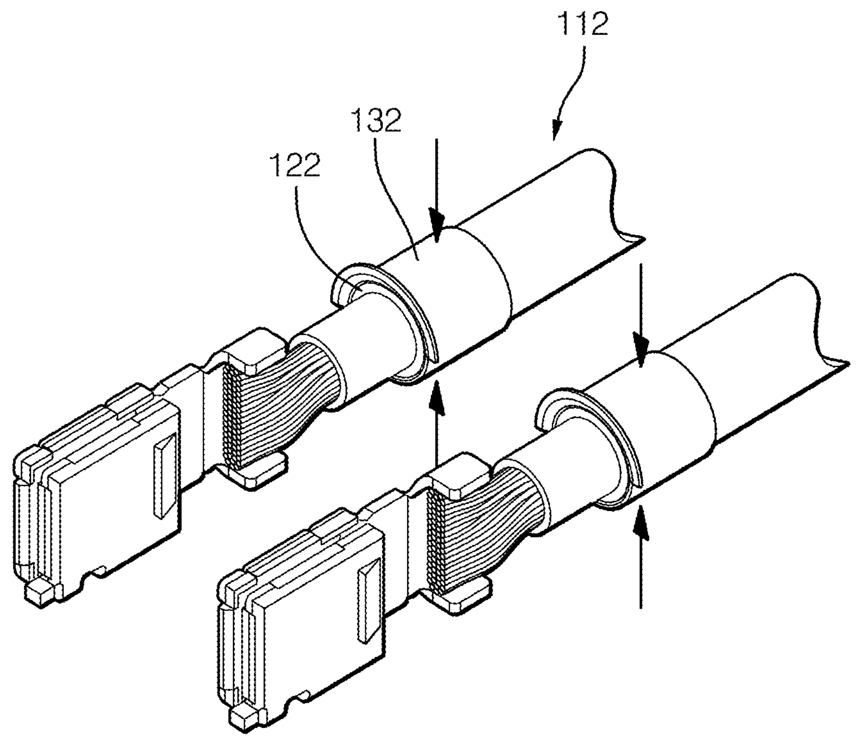
PRIOR ART FIG. 1C
Figure 1D:
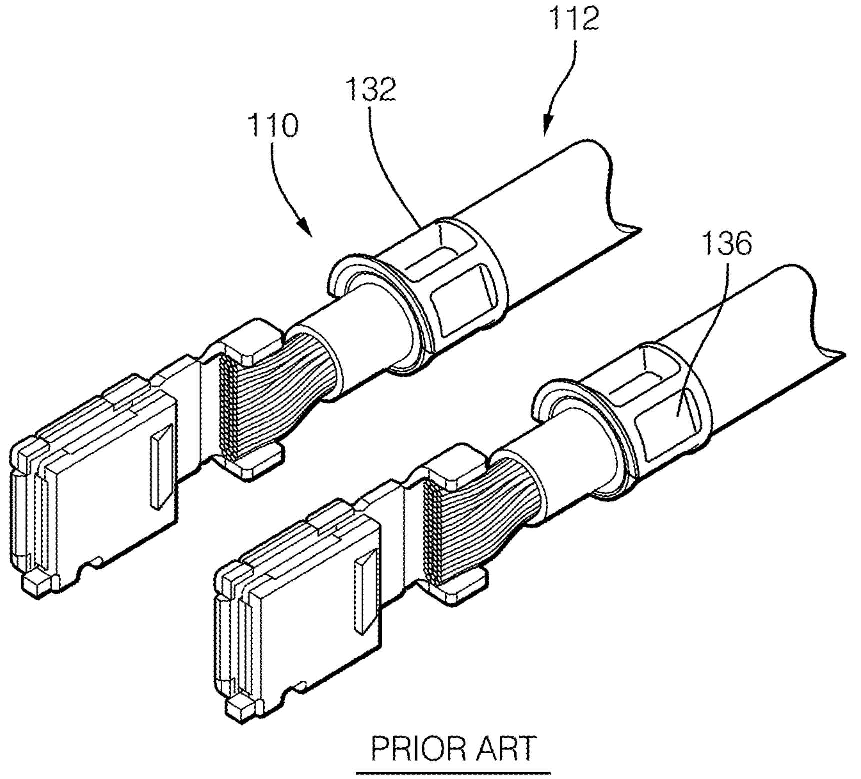
PRIOR ART FIG. 1D

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

Presented herein is a terminal assembly including features configured to terminate a shield of a shielded cable having an inner conductor, an inner insulator surrounding the inner conductor, an outer conductor surrounding the inner insulator, and an outer insulator surrounding the outer conductor. The terminal assembly includes a generally cylindrical outer ferrule that is formed of a plastic conductive material and a generally cylindrical inner ferrule that is formed of an elastic dielectric material. As used herein, plastic means that the shape of the material is permanently deformed after an applied stress is removed and elastic means that the material is capable of recovering original size and shape after an applied stress is removed. The inner ferrule is placed over an end portion of the shielded cable. A portion of the outer insulator is removed and an exposed portion of the outer conductor is placed over the inner ferrule and the outer ferrule is then placed over the inner ferrule. The outer ferrule is then crimped to retain the terminal assembly to the shielded cable, plastically deforming the outer ferrule and elastically deforming the inner ferrule. The exposed portion of the outer conductor is disposed intermediate the inner and outer ferrules and is in intimate contact therewith.

Reference numbers for similar features in the drawings and the description of the prior art and the various embodiments of the invention share the last two digits.

By referring now to the drawings, embodiments of the invention will be explained below. It will be appreciated that the terminal assemblies shown in FIGS. 1A-1D and FIG. 8 do not fall within the scope of the claims but are provided here as they clarify the scope of the invention.

Figure 2:
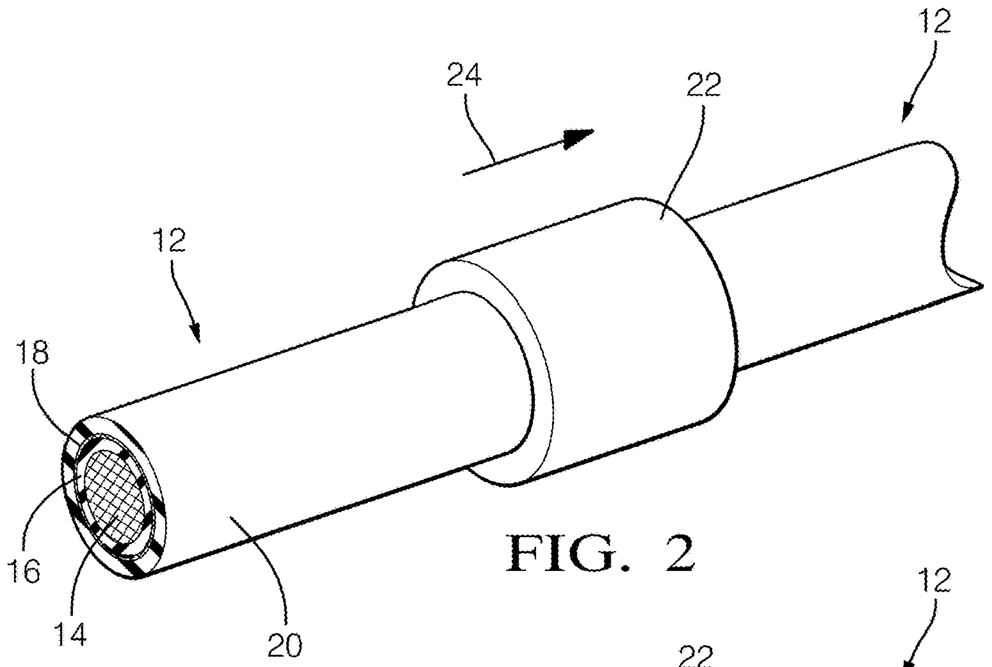
FIGS. 2-6 are perspective side views illustrating a method of forming a terminal assembly having a metallic outer ferrule and a resilient inner ferrule according to an embodiment of the invention.

FIGS. 2-7 illustrate an example of a terminal assembly 10 configured to terminate a shield of a shielded cable 12 and a method of forming such a terminal assembly 10. As shown in FIG. 2, the shielded cable 12 includes an inner conductor 14 comprising metallic core wires, a first or inner insulator 16 surrounding the inner conductor 14, an outer conductor 18 formed of braided metallic wires which sheathe the inner insulator 16, and a second or outer insulator 20 that covers the outer conductor 18. A sleeve-like body or generally cylindrical inner ferrule 22 having an inner diameter sufficient to receive the shielded cable 12 is slid over an end portion of the shielded cable 12 in a direction shown by arrow 24.

Figure 7:
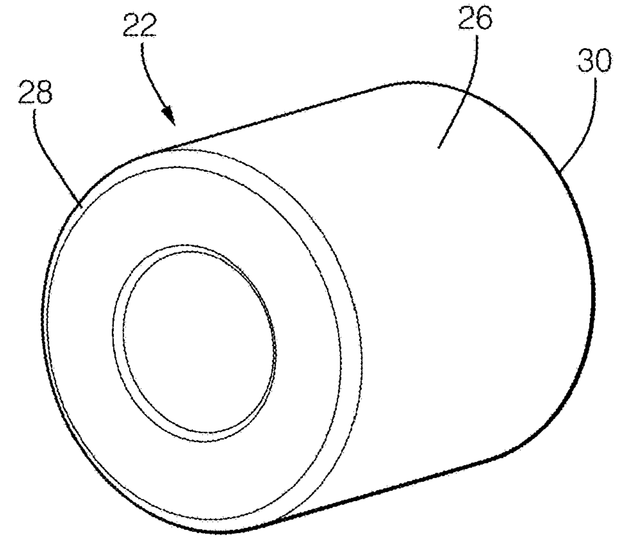
FIG. 7 is a perspective side view of an inner ferrule of the terminal assembly of FIGS. 2-6 according to an embodiment of the invention.

As shown in FIG. 7, the outer surface 26 of the inner ferule 22 has a generally uniform outer diameter. Leading and trailing edges 28, 30 of the inner ferrule 22 may be beveled. The inner ferrule 22 is formed of a resilient compressible dielectric material. The resilient compressible dielectric material is an elastomeric material having a Shore A durometer hardness between 50 and 80, such as silicone-based material. The inner ferrule 22 merely serves to support the outer conductor 18 and does not need to electrically communicate with the outer conductor 18. The inner ferrule 22 may be formed by an injection molding process.

Although the inner ferrule 22 is formed into a complete cylindrical body in the embodiment shown in FIGS. 2-7, the inner ferrule may alternatively comprise a pair of half parts divided axially or may be provided with a slit extending axially since the inner ferrule could be brought into a complete cylinder when it is assembled on the shielded cable and may simplify the step of mounting the inner ferrule to the shielded cable.

Figure 3:
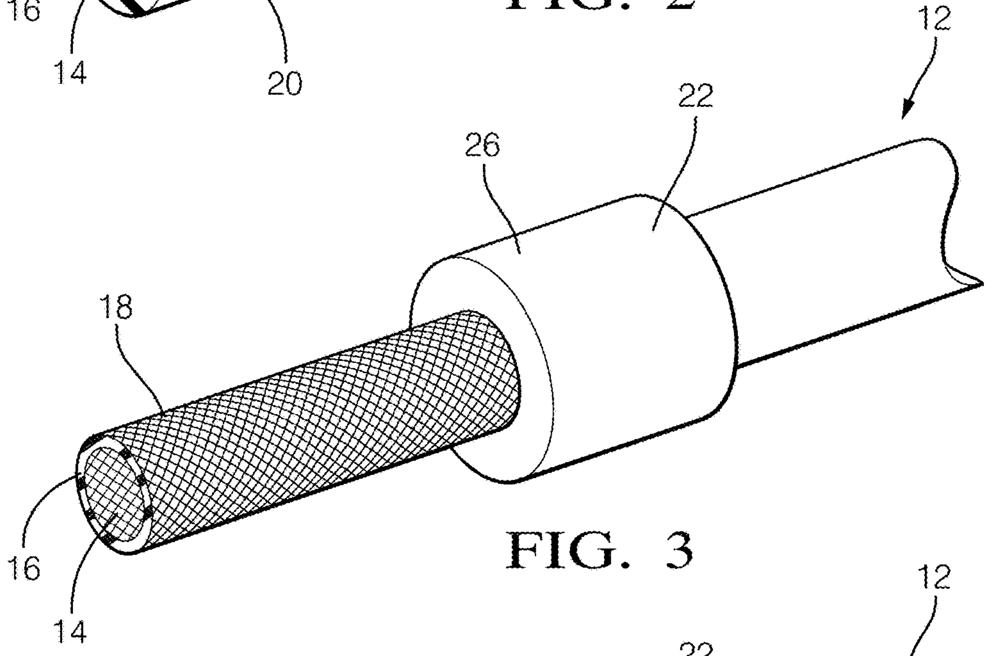
Figure 4:
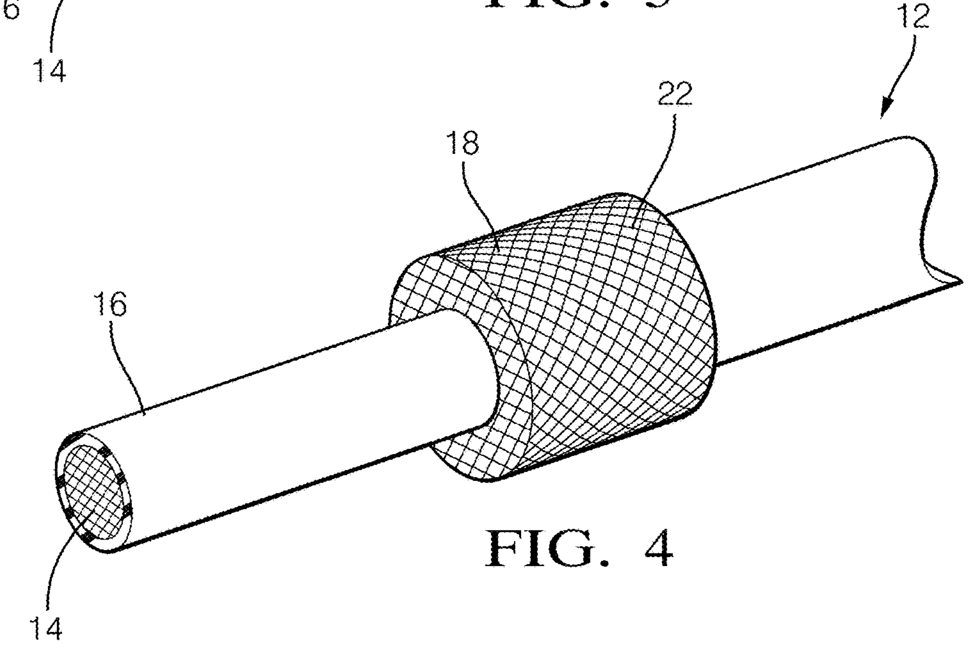

Looking now at FIG. 3, the shielded cable 12 is stripped at one end so that at least a portion of the outer insulator 20 is removed exposing the braided wires of the outer conductor 18. Then, as shown in FIG. 4, the braided wires of the outer conductor 18 are flared and pulled back over the inner ferrule 22 covering at least a portion of the outer surface 26 of the inner ferrule 22.

Figure 5:
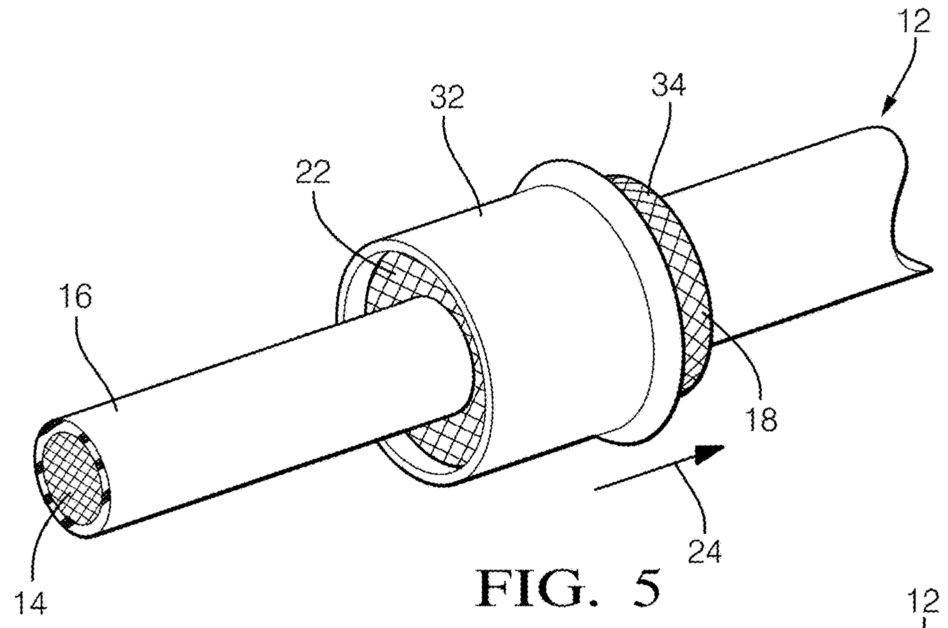

Next, as shown in FIG. 5, another sleeve-like body or generally cylindrical outer ferrule 32 having an inner diameter sufficient to receive the inner ferrule 22 and braided wires of the outer conductor 18 coving the inner ferrule 22 is slid over at least a portion of the inner ferrule 22 in the direction shown by arrow 24. The outer ferrule 32 is formed of a conductive metallic material, such as a tin plated copper alloy. The outer ferrule 32 may be formed by a deep draw stamping process or a machining process. At least one open end 34 of the outer ferrule 32 has an opening as large as the inner diameter of the outer ferrule 32.

Figure 6:
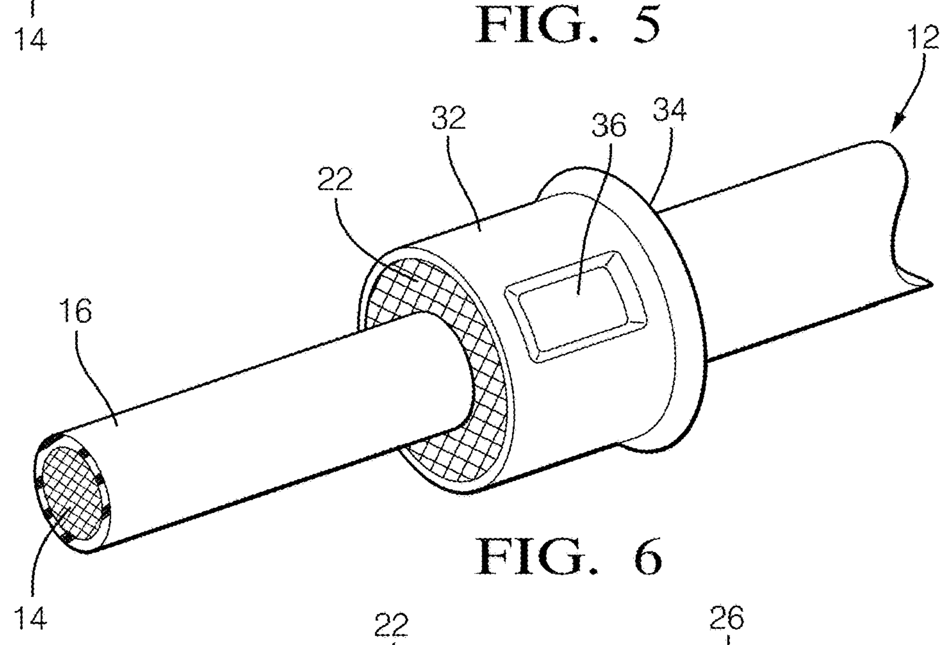

Finally, as shown in FIG. 6, the outer ferrule 32 is crimped, i.e. indentations 36 are formed in the outer ferrule 32, thereby plastically deforming the outer ferrule 32 and elastically deforming the inner ferrule 22 in order to retain the terminal assembly 10 to the shielded cable 12 and putting the outer ferrule 32 and inner ferrule 22 in intimate contact with the outer conductor 18 therebetween. The outer ferrule 32 may then be electrically connected to an electrical ground (not shown) such as a conductive casing.

Figure 8:
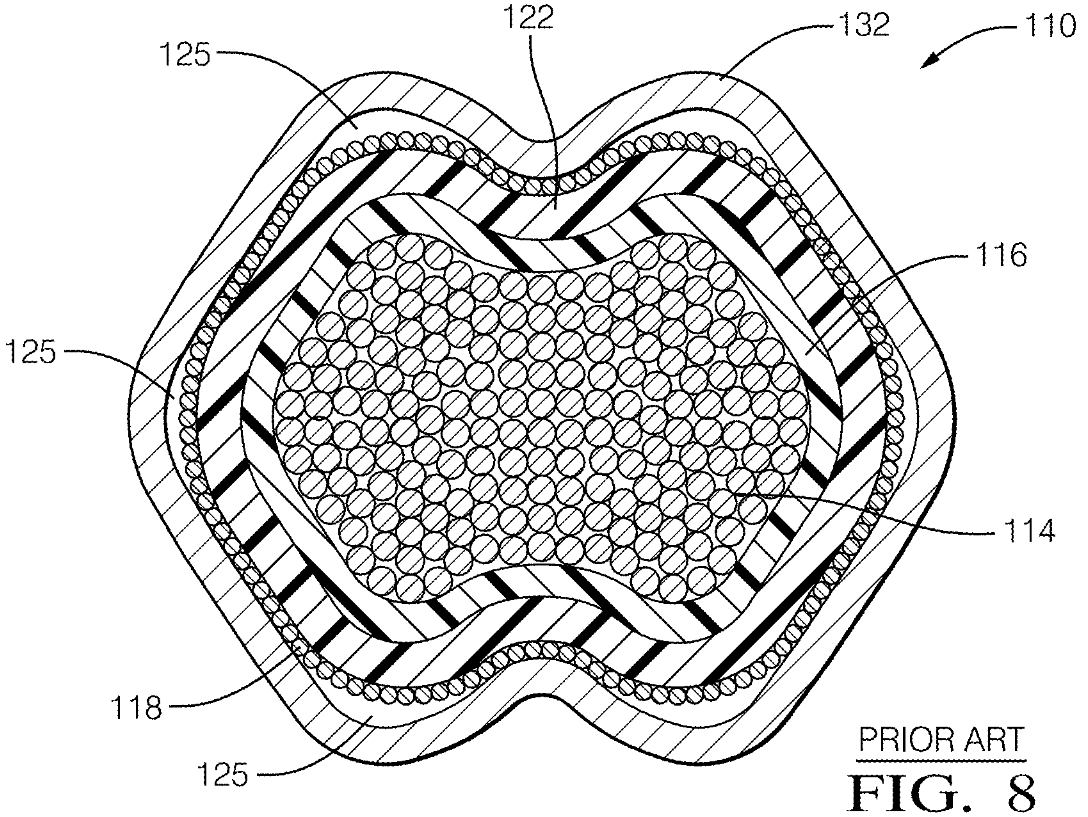
FIG. 8 is a cross section view of terminal assembly of FIGS. 1A-1D according to the prior art.

FIG. 8 illustrates an example of a cross section of a crimped terminal assembly 110 having a metallic outer ferrule 132 and a metallic inner ferrule 122 according to the prior art. The outer ferrule 132 and the inner ferrule 122 are both plastically deformed during the crimping process. As can be seen, there are voids 125 between inner ferrule 122 and the outer ferrule 132 that may reduce the pull off force needed to pull the terminal assembly 110 off of the shielded cable and could allow water and other contaminants to enter the terminal assembly 110 causing corrosion that could increase electrical resistance between the outer conductor 118 and the outer ferrule 132 and further reduce pull off force. In addition, there are a number of the strands of the braided wires of the outer conductor 118 that are not in contact with the outer ferrule 132 which may further increase electrical resistance between the outer conductor 118 and the outer ferrule 132.

Figure 9:
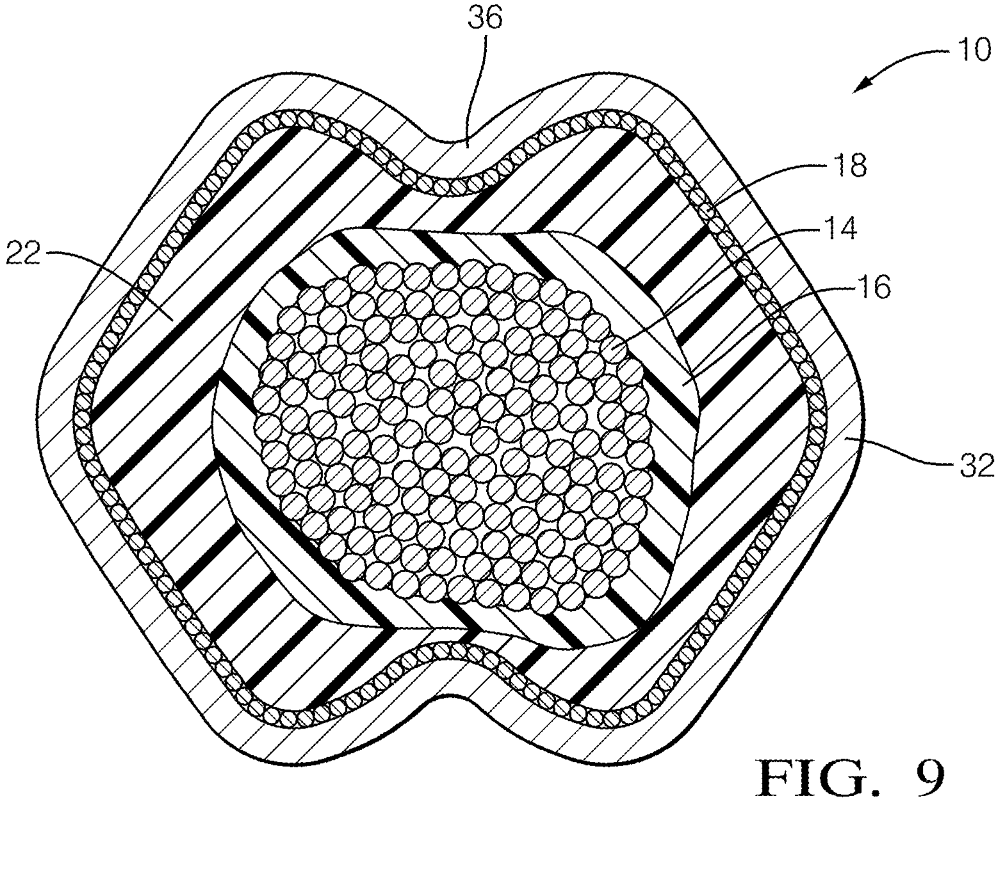
FIG. 9 is a cross section view of terminal assembly of FIGS. 2-6 according to an embodiment of the invention.

FIG. 9 illustrates a cross section of the terminal assembly 10 shown in FIGS. 2-7 and described above. In contrast to the terminal assembly 10 shown in FIG. 8, the number and size of voids is greatly reduced. Further, there are fewer strands of the strands of the braided wires of the outer conductor 18 that are not in contact with the outer ferrule 32.

Through testing, the terminal assembly 110 of FIG. 8 has been found to have a pull off force of about 560 newtons while the terminal assembly 10 of FIG. 9 has been found to have a pull off force of about 690 newtons, meeting or exceeding the pull off force performance of terminal assembly 110. Without subscribing to any particular theory of operation, the elastic deformation of the inner ferrule 22 provides the reduction of voids between the inner and outer ferrule 32 and may contribute to improved pull off force performance compared with the prior art terminal assembly 110. In addition, testing by the inventors has found that the resistance between the outer conductor 18 and the outer ferrule 32 of the terminal assembly 10 is comparable to the terminal assembly 110.

It may be appreciated that the terminal assembly 10 has a reduced likelihood of short circuit between the outer ferrule 32 or outer conductor 18 and the inner conductor 14 since the inner ferrule 22 is also an insulating body rather than a conductive body as seen in prior art terminal assemblies, e.g. FIG. 8.

In addition, it may be recognized that an outer ferrule 32 having one specific inner diameter may be used with multiple shielded cable 12 diameters by merely varying the inner and outer diameter of the resilient inner ferrule 22, since it is no longer necessary to maintain a difference between the inner diameter of the outer ferrule 32 and the outer diameter of a metallic inner ferrule 22 of about 1 millimeter to avoid issues of thick inner ferrules can degrade the strength of the crimp and thin inner ferrules can rupture during crimping described in the BACKGROUND OF THE INVENTION section above. This will reduce the number of different outer ferrule designs and part numbers required to accommodate different cable sizes. The inner ferrule 22 can easily be color coded to identify different inner ferrule 22 sizes by adding a colorant to the elastomeric material prior to molding the inner ferrule 22.

Figure 10:
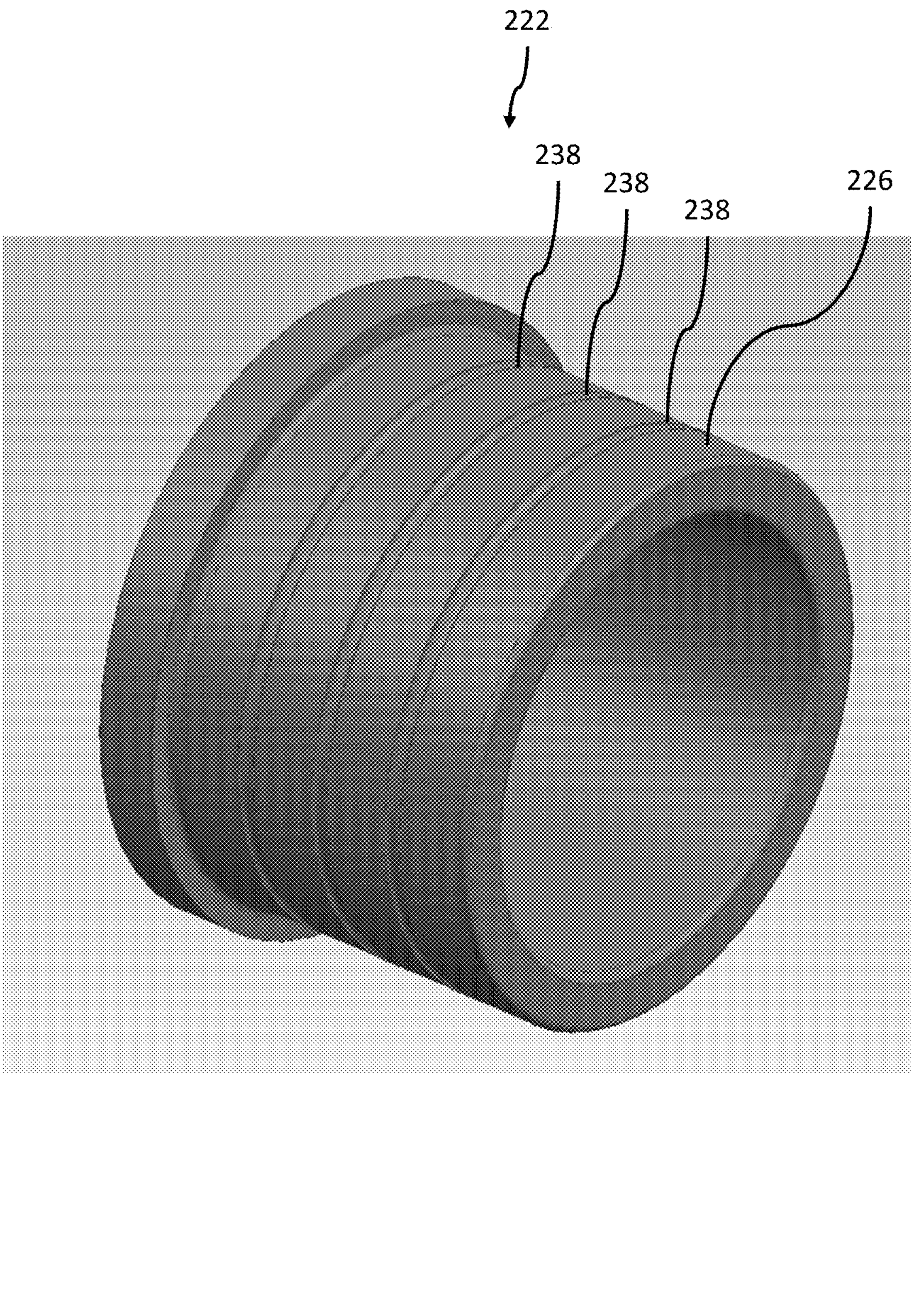
FIG. 10 is a perspective side view of an inner ferrule of the terminal assembly of FIGS. 2-6 having a plurality of circumferential grooves defined in an outer surface according to an embodiment of the invention.

FIG. 10 illustrates a non-limiting example of an inner ferrule 222 that includes a plurality of grooves 238 in the outer surface 226 of the inner ferrule 222 extending circumferentially around the inner ferrule 222. The inventors have discovered that the definition of the grooves 238 in the outer surface 226 of the inner ferrule 222 improves retention of the outer ferrule 32 to the inner ferrule 222 and thereby increasing the pull off force that the terminal assembly 10 can withstand before separating from the shielded cable 12.

Figure 11:
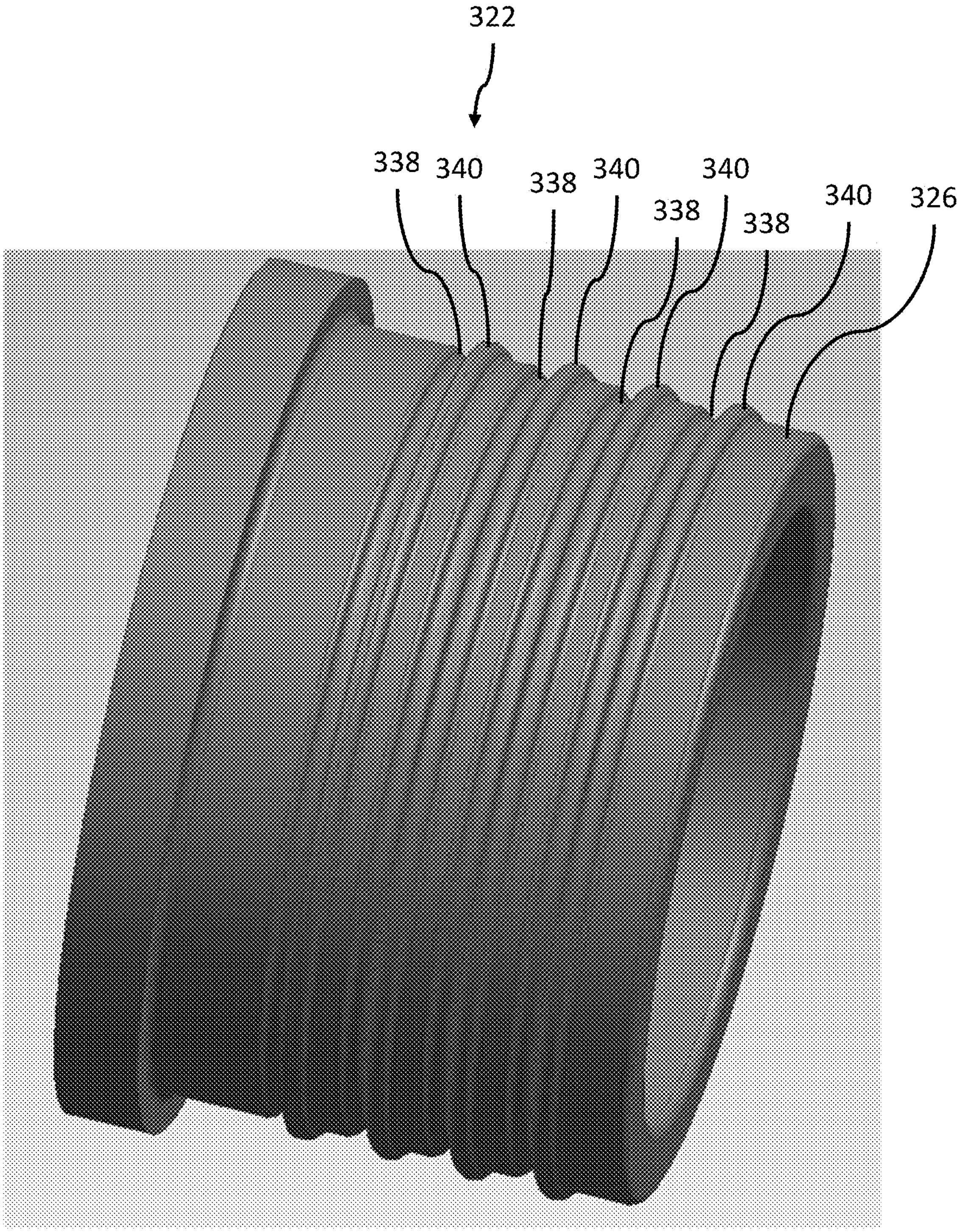
FIG. 11 is a perspective side view of an inner ferrule of the terminal assembly of FIGS. 2-6 having a plurality of circumferential grooves and circumferential ridges defined in an outer surface according to an embodiment of the invention.
Figure 12:
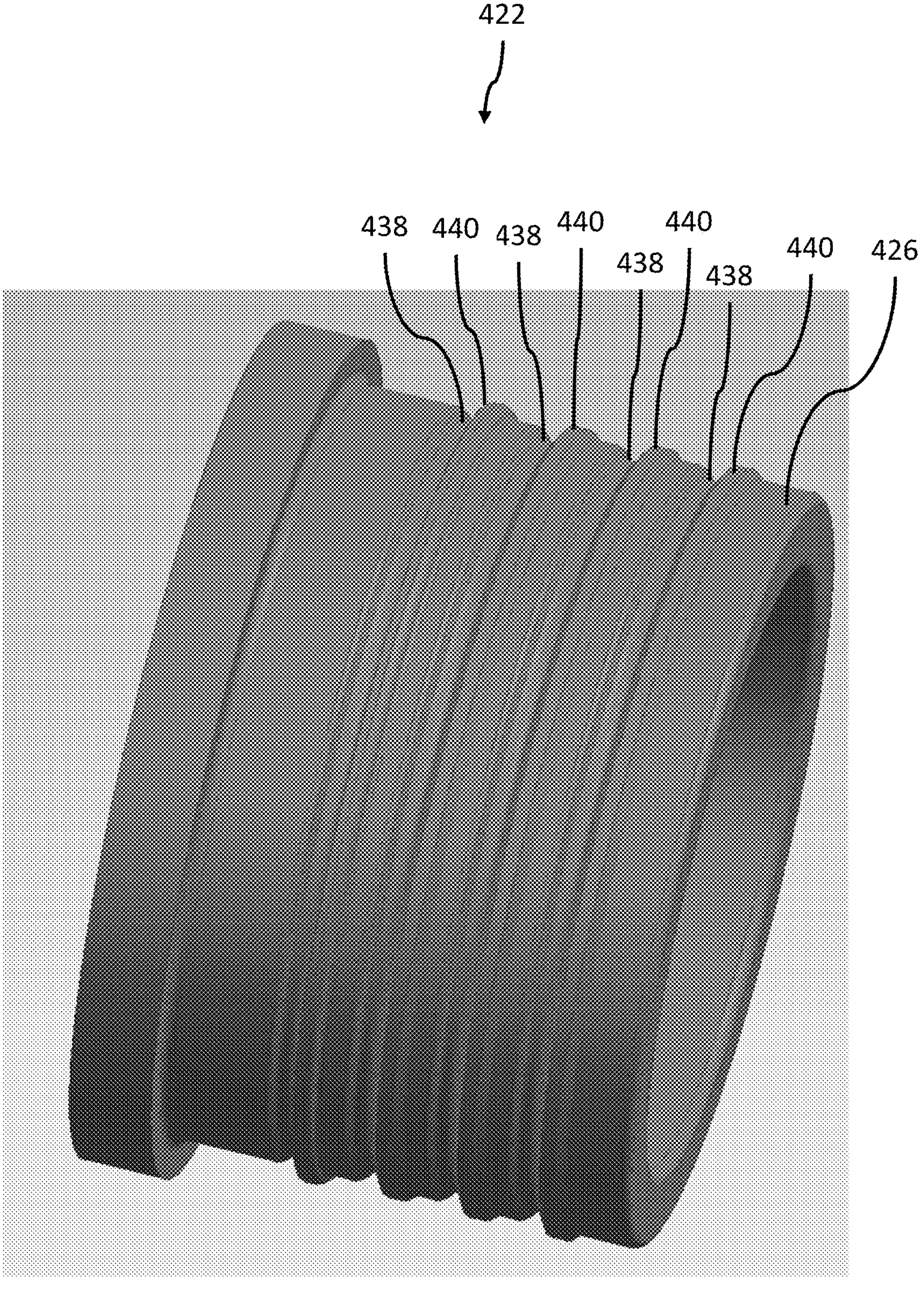
FIG. 12 is a perspective side view of an inner ferrule of the terminal assembly of FIGS. 2-6 having a plurality of circumferential grooves and circumferential ridges defined in an outer surface according to an embodiment of the invention.
Figure 13A:
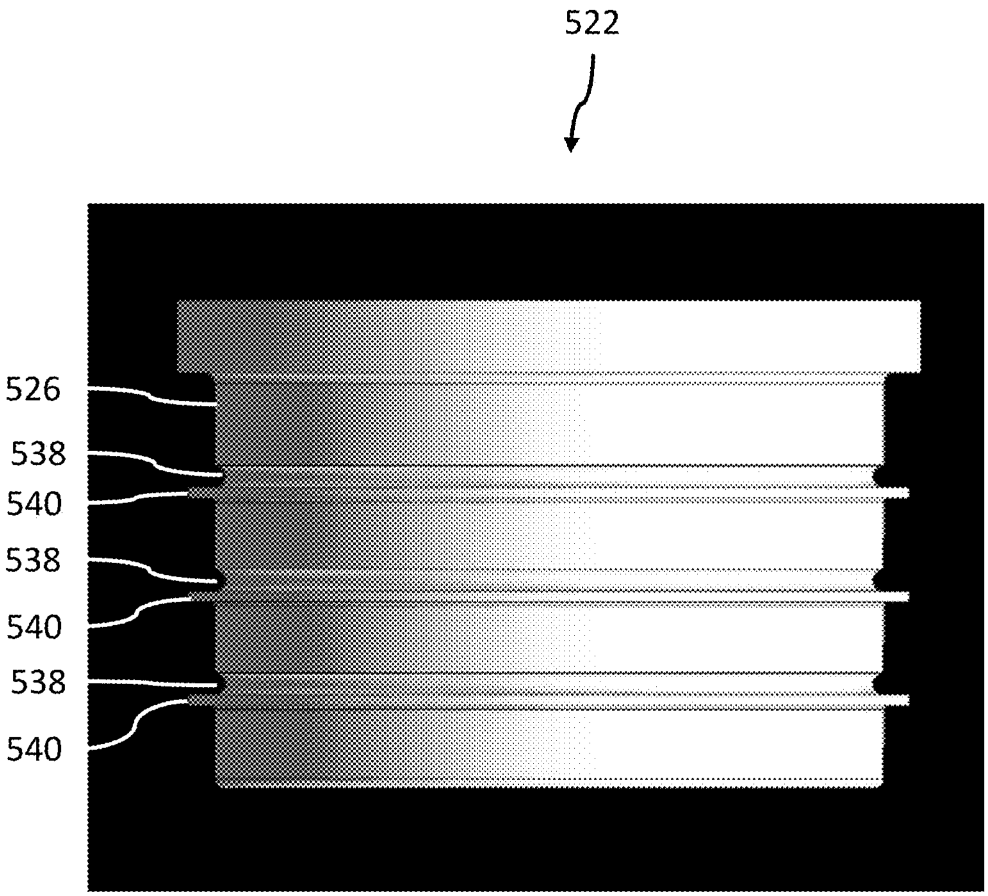
FIG. 13A is a side view of an inner ferrule of the terminal assembly of FIGS. 2-6 having a plurality of circumferential grooves and circumferential ridges defined in an outer surface according to an embodiment of the invention.
Figure 13B:
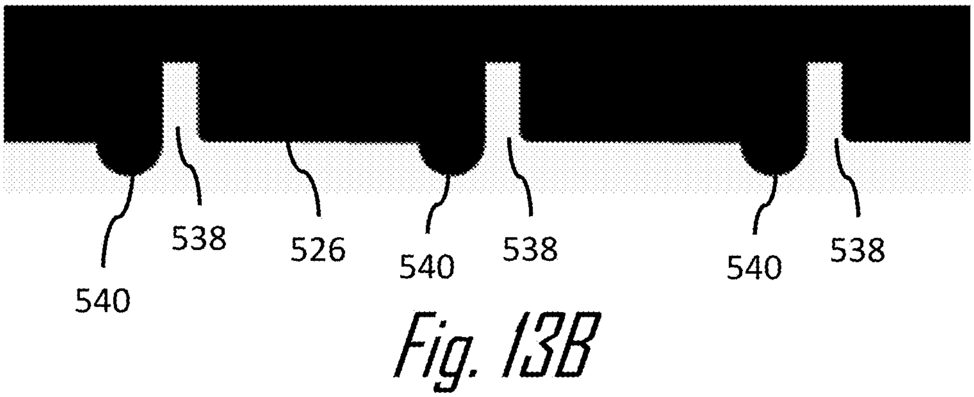
FIG. 13B is a cross section view of the inner ferrule of FIG. 13A according to an embodiment of the invention.
Figure 14A:
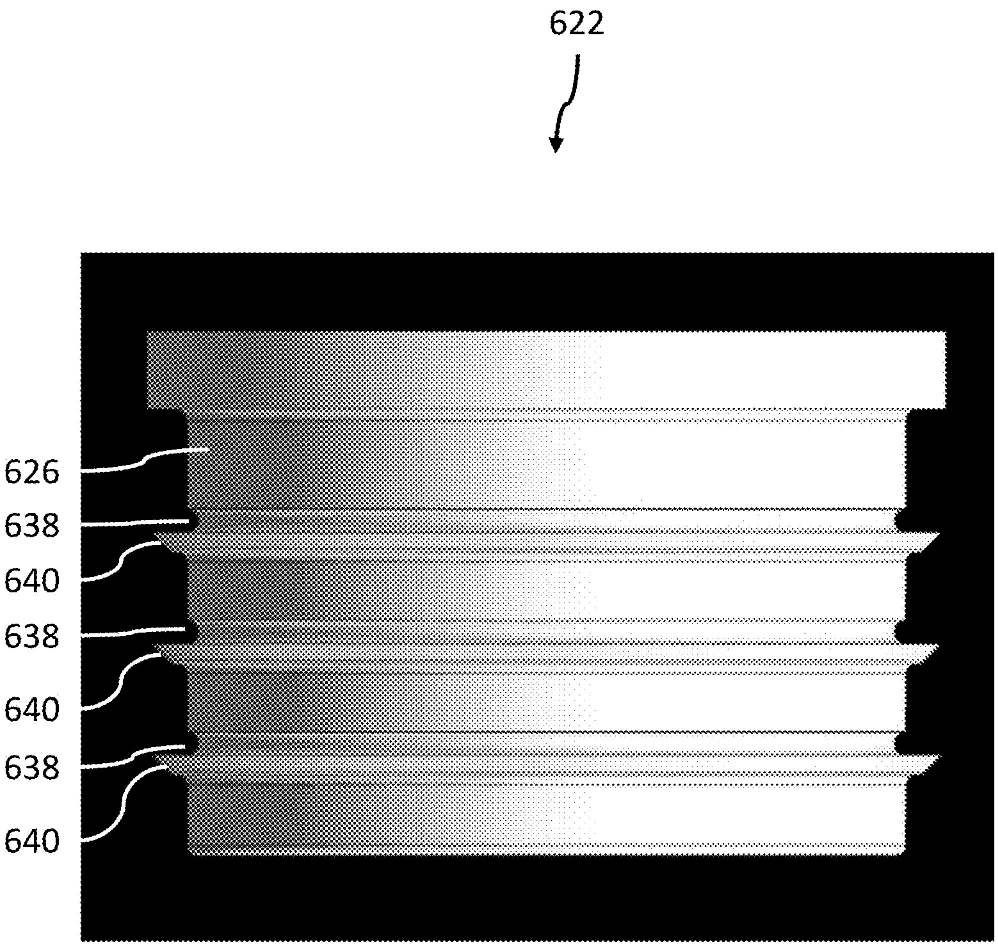
FIG. 14A is a side view of an inner ferrule of the terminal assembly of FIGS. 2-6 having a plurality of circumferential grooves and circumferential ridges defined in an outer surface according to an embodiment of the invention.
Figure 14B:
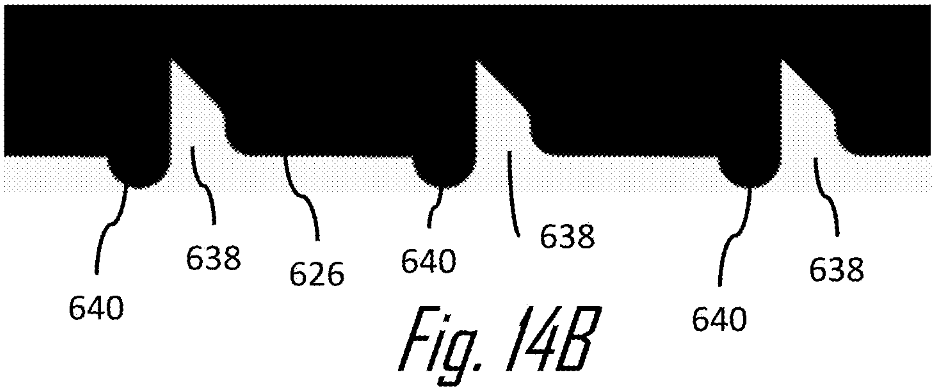
FIG. 14B is a cross section view of the inner ferrule of FIG. 14A according to an embodiment of the invention.
Figure 15A:
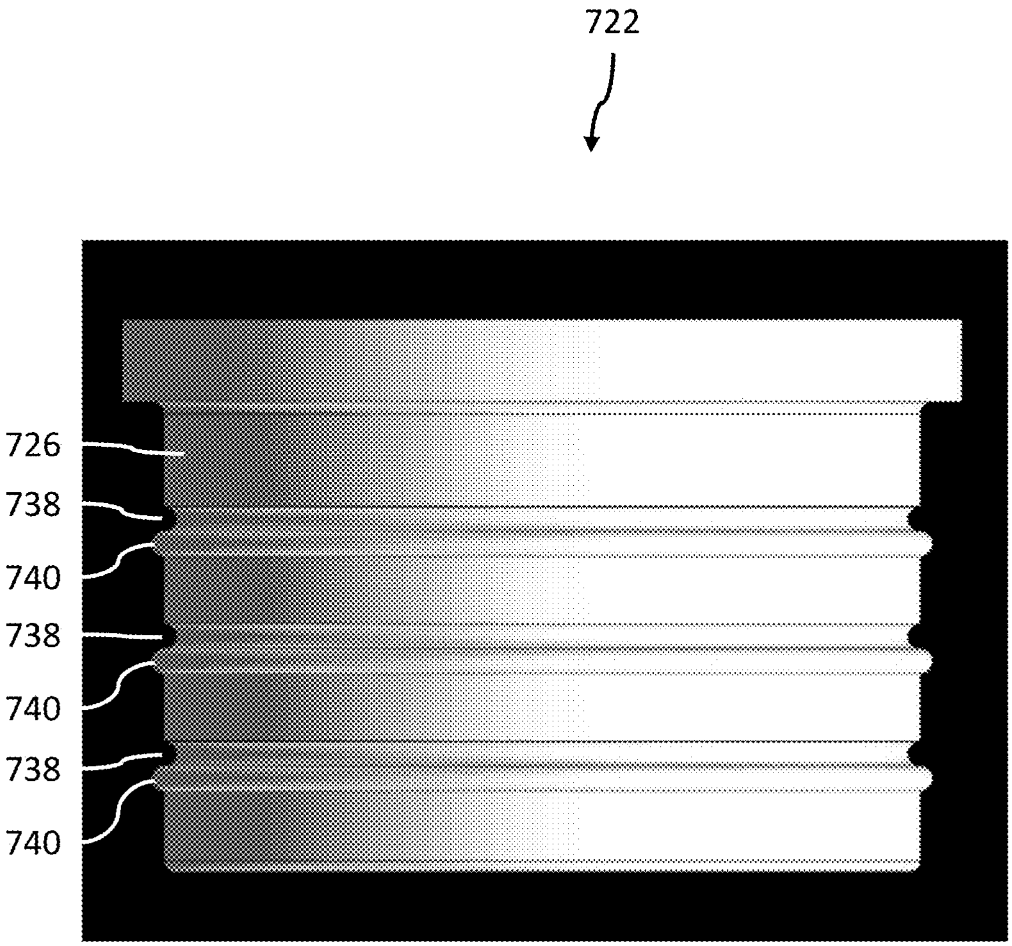
FIG. 15A is a side view of an inner ferrule of the terminal assembly of FIGS. 2-6 having a plurality of circumferential grooves and circumferential ridges defined in an outer surface according to an embodiment of the invention.
Figure 15B:
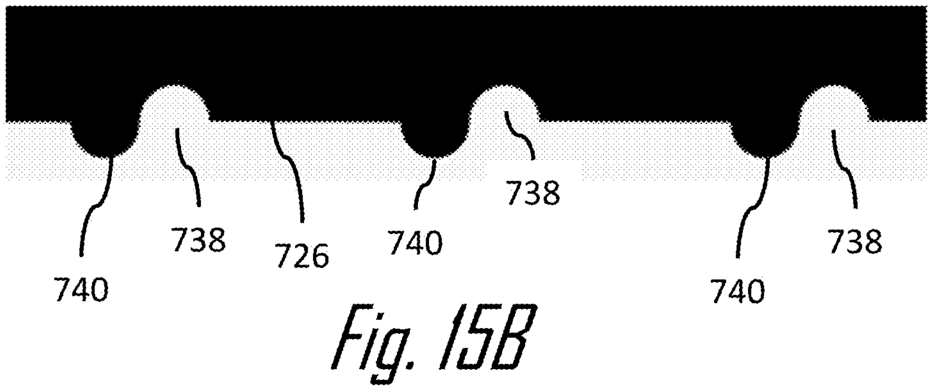
FIG. 15B is a cross section view of the inner ferrule of FIG. 15A according to an embodiment of the invention.
Figure 16A:
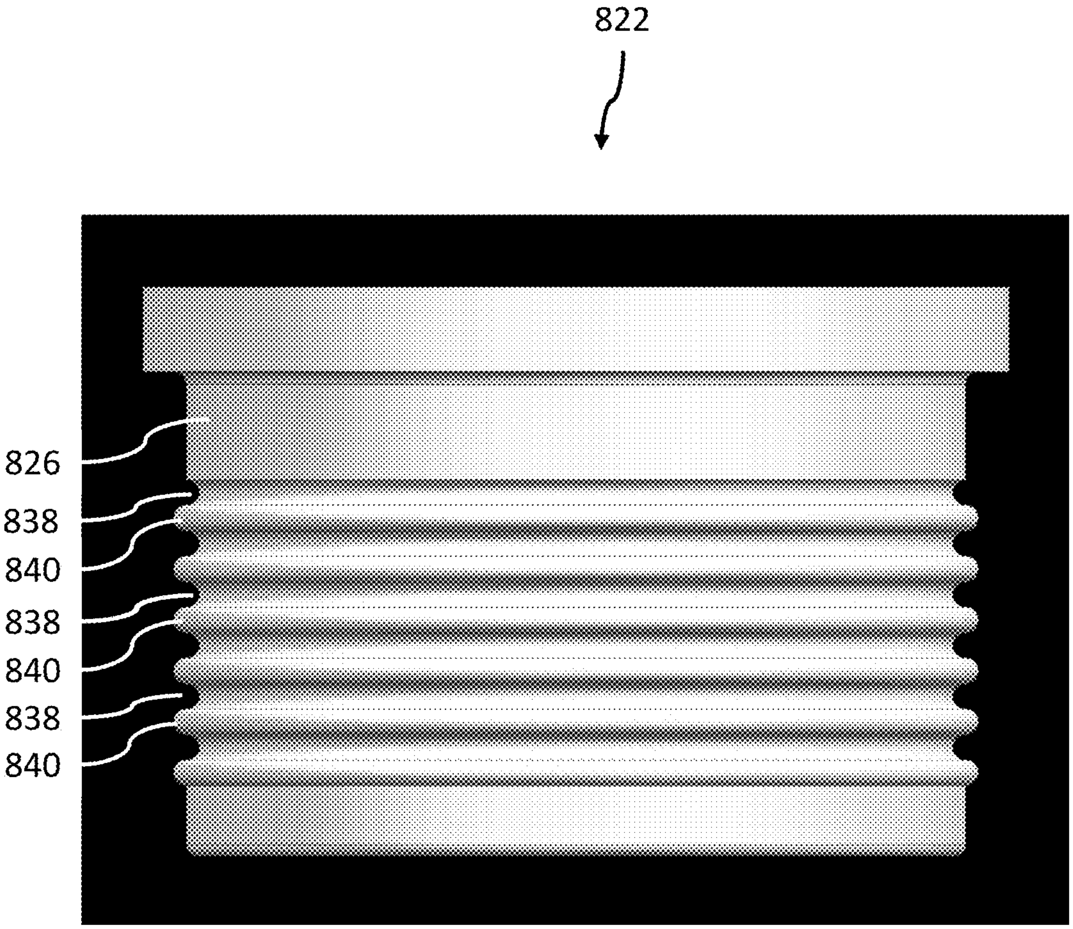
FIG. 16A is a side view of an inner ferrule of the terminal assembly of FIGS. 2-6 having a plurality of circumferential grooves and circumferential ridges defined in an outer surface according to an embodiment of the invention.
Figure 16B:
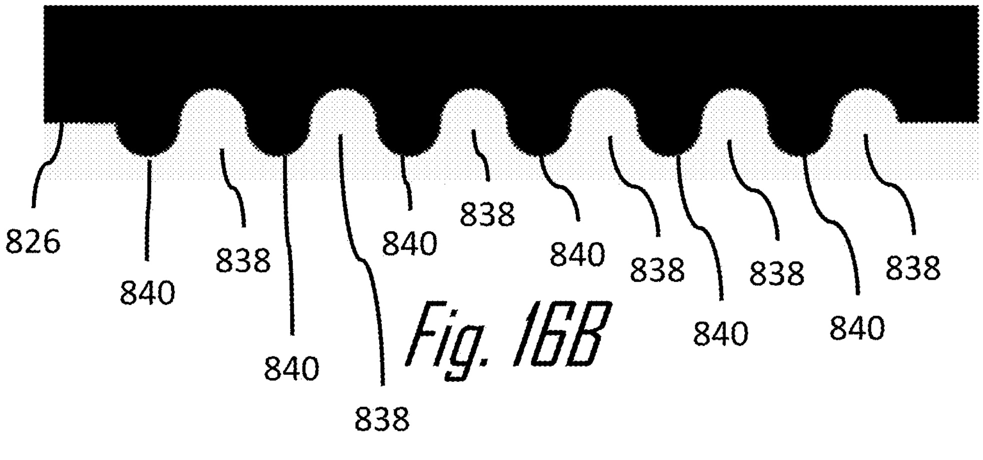
FIG. 16B is a cross section view of the inner ferrule of FIG. 16A according to an embodiment of the invention.
Figure 17A:
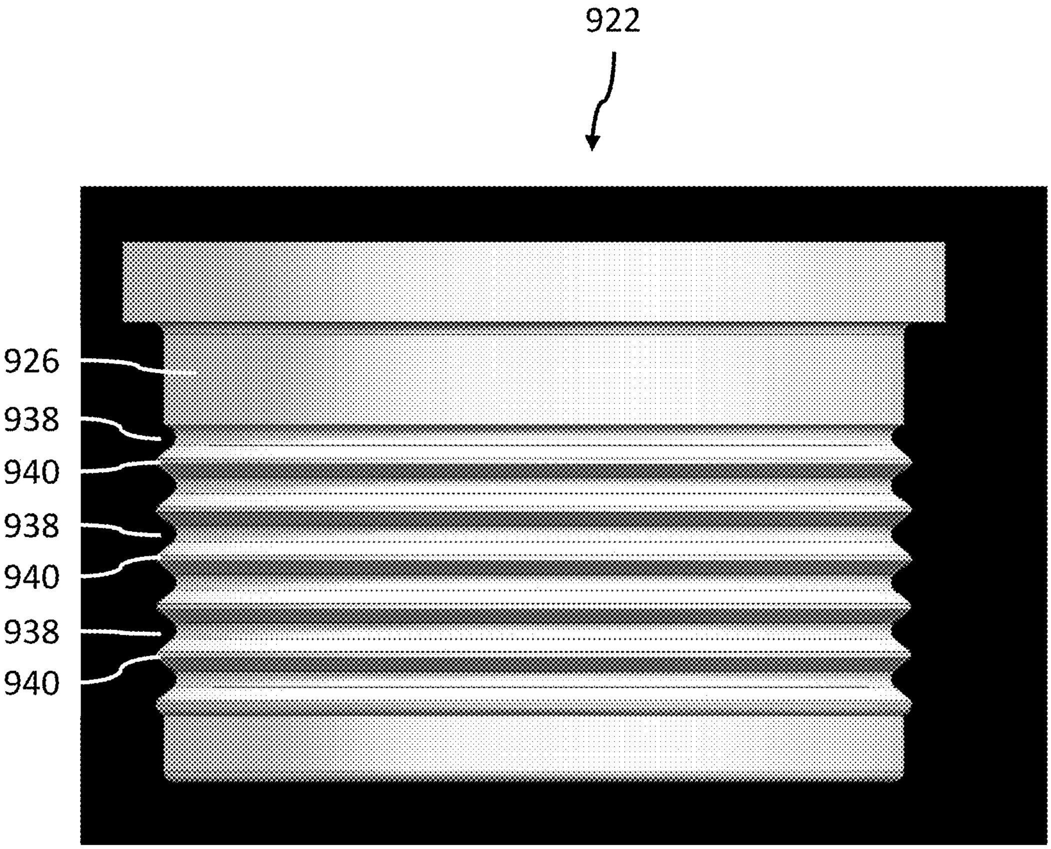
FIG. 17A is a side view of an inner ferrule of the terminal assembly of FIGS. 2-6 having a plurality of circumferential grooves and circumferential ridges defined in an outer surface according to an embodiment of the invention.
Figure 17B:
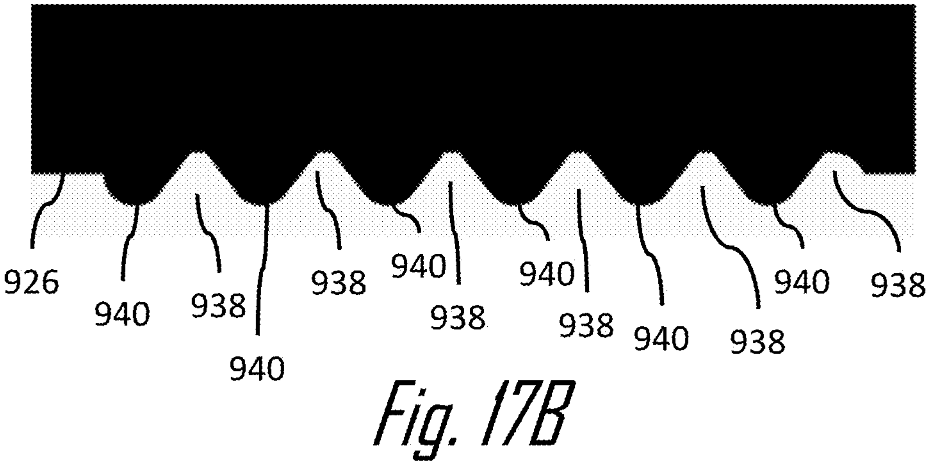
FIG. 17B is a cross section view of the inner ferrule of FIG. 17A according to an embodiment of the invention.
Figure 18A:
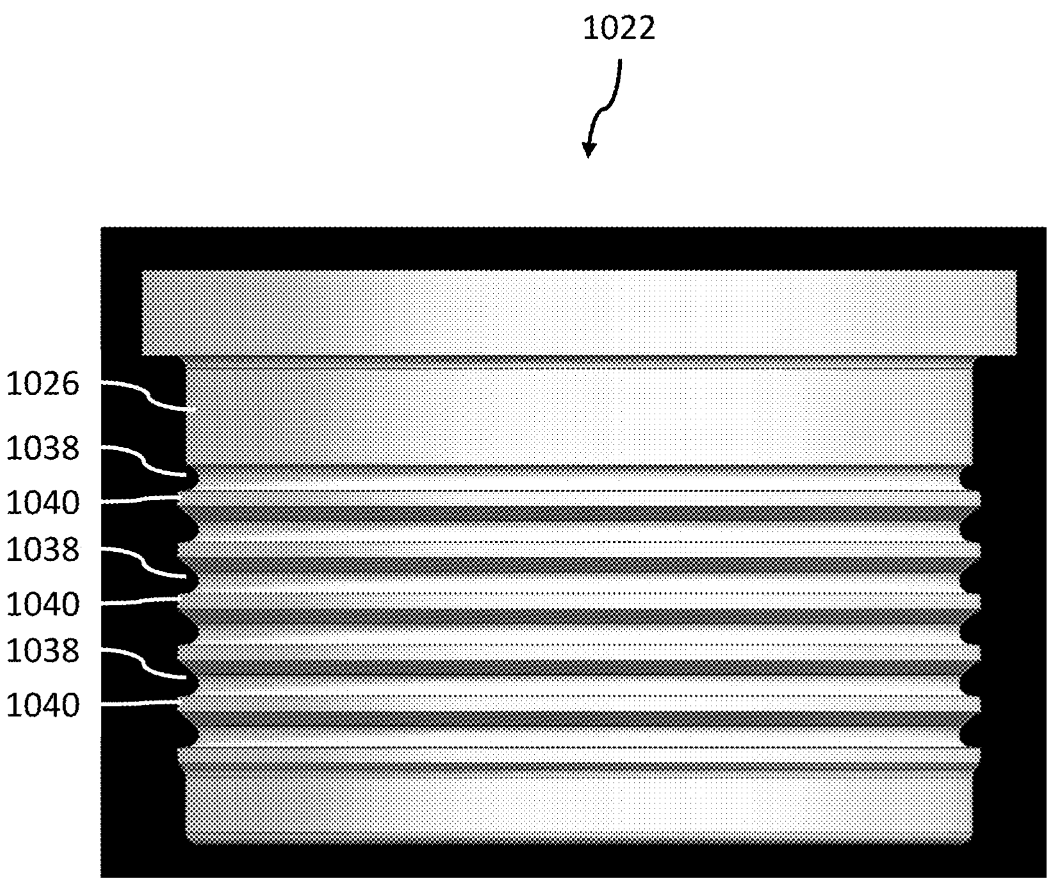
FIG. 18A is a side view of an inner ferrule of the terminal assembly of FIGS. 2-6 having a plurality of circumferential grooves and circumferential ridges defined in an outer surface according to an embodiment of the invention.
Figure 18B:
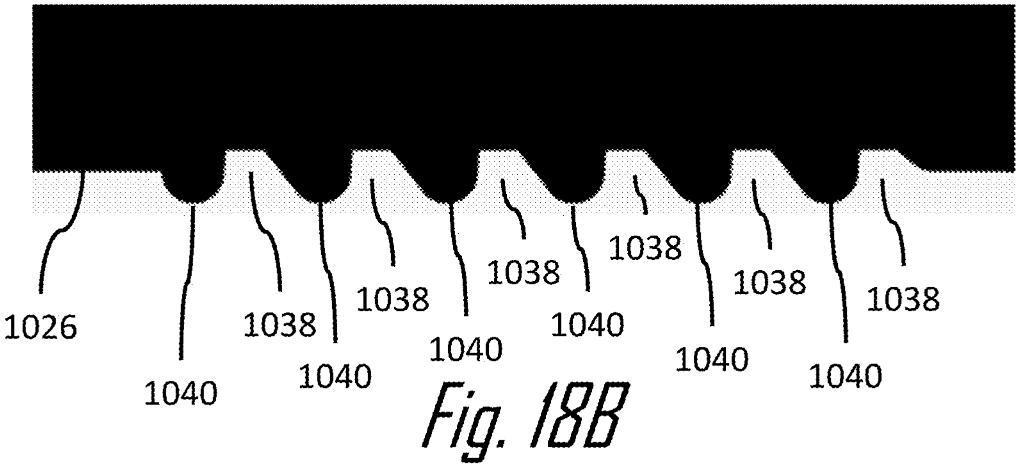
FIG. 18B is a cross section view of the inner ferrule of FIG. 18A according to an embodiment of the invention.

FIG. 11 illustrates a non-limiting example of an inner ferrule 322 that includes a plurality of ridges 340 protruding from the outer surface 326 of the inner ferrule 322 extending circumferentially around the inner ferrule 322 in addition to a plurality of grooves 338 similar to those shown in shown in FIG. 11. The ridges 340 are arranged so that at least one of the ridges 340 are intermediate two adjoining grooves 338. As shown in FIG. 11, each ridge 340 is adjacent each groove 338. The inventors have discovered that the addition of ridges 340 to the grooves 338 in the outer surface 326 of the inner ferrule 322 may further improve retention of the outer ferrule 32 to the inner ferrule 322 and thereby increasing the pull off force that the terminal assembly 10 can withstand before separating from the shielded cable 12.

FIGS. 12 through 18B illustrated other non-limiting alternative examples of inner ferrules 422, 522, 622, 722, 822, 922, 1022 having a plurality of circumferential grooves 438, 538, 638, 738, 838, 938, 1038 and ridges 440, 540, 640, 740, 840, 940, 1040. As can be seen in FIGS. 12-18B, the profile shapes of the grooves and ridges may vary and may provide benefits of improved pull off force or reduced electrical resistance between the outer ferrule and the outer conductor.

Figure 19A:
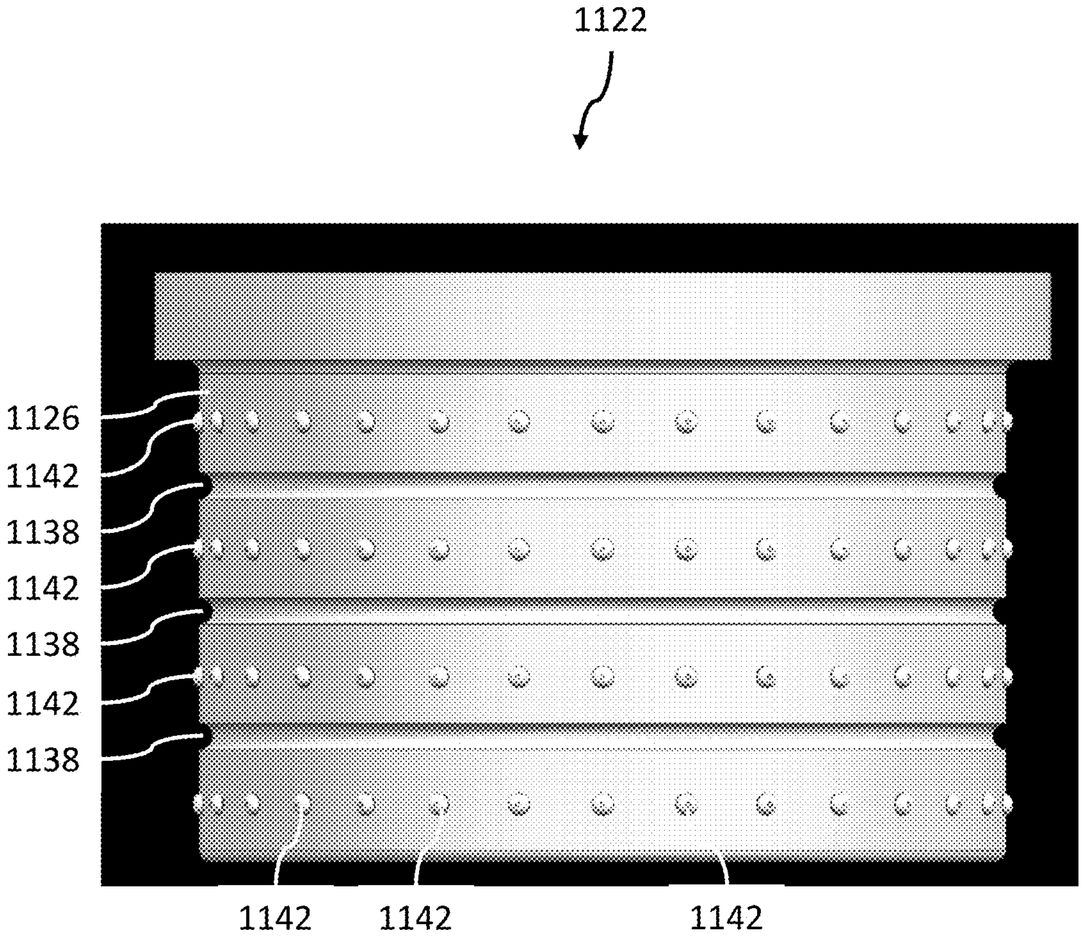
FIG. 19A is a side view of an inner ferrule of the terminal assembly of FIGS. 2-6 having a plurality of circumferential grooves and circumferentially arranged projections defined in an outer surface according to an embodiment of the invention.
Figure 19B:
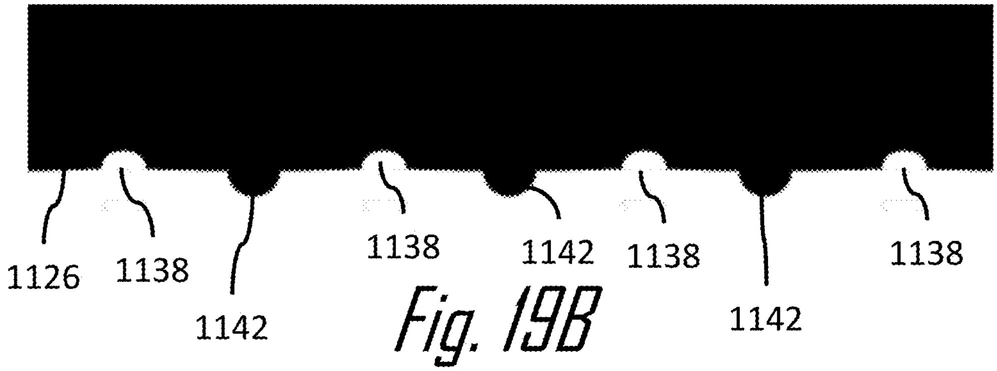
FIG. 19B is a cross section view of the inner ferrule of FIG. 19A according to an embodiment of the invention.

FIGS. 19A and 19B illustrate a non-limiting alternative example of an inner ferrule 1122 having a plurality of circumferential grooves 1138 and a series of projections 1142 circumferentially arranged on the outer surface of the inner ferrule. As can be best seen in FIG. 19B, the projections 1142 are a series of hemispherical bumps. These grooves 1138 and projections 1142 and may also provide benefits of improved pull off force or reduced electrical resistance between the outer ferrule and the outer conductor.

While the examples of the terminal assembly presented above illustrate a shielded cable having a braided outer conductor, other embodiments of the invention may be envision that are used with a shielded cable having foil or conductive film outer conductors.

Accordingly a terminal assembly 10 having an inner ferrule 22 formed of a resilient compressible dielectric material is provided. The terminal assembly 10 provides a cost advantage over prior art terminal assemblies 110 by replacing deep drawn or machined inner ferrules with a molded inner ferrule that can be produced inexpensively. One size inner ferrule may be molded to match required cable size which eliminates the need for multiple sizes of inner ferrules. The terminal assembly 10 may also allow some applications to use one outer ferrule size for multiple cable sizes. The inner ferrule 22 may be common to multiple applications. The inner ferrule 22 may be colored to provide visual differentiation between various sizes. The inner ferrule 22 provides increased insulation protection for the inner conductor and decreases the risk of piercing through the insulation of the core conductor. The inner ferrules 122-822 incorporate grooves or grooves and projections that improve the retention of the outer ferrule to the outer conductor and inner ferrule in order to meet or exceed the pull off force compared to the prior art terminal assembly 110.

While this invention has been described in terms of the preferred embodiments thereof, it is not intended to be so limited, but rather only to the extent set forth in the claims that follow. For example, the above-described embodiments (and/or aspects thereof) may be used in combination with each other. In addition, many modifications may be made to configure a particular situation or material to the teachings of the invention without departing from its scope. Dimensions, types of materials, orientations of the various components, and the number and positions of the various components described herein are intended to define parameters of certain embodiments, and are by no means limiting and are merely prototypical embodiments.

Many other embodiments and modifications within the spirit and scope of the claims will be apparent to those of skill in the art upon reviewing the above description. The scope of the invention should, therefore, be determined with reference to the following claims, along with the full scope of equivalents to which such claims are entitled.

As used herein, 'one or more' includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms “a”, “an” and “the” are intended to include the plural forms as well, unless the context clearly indicates otherwise. It will also be understood that the term “and/or” as used herein refers to and encompasses any and all possible combinations of one or more of the associated listed items. It will be further understood that the terms “includes,” “including,” “comprises,” and/or “comprising,” when used in this specification, specify the presence of stated features, integers, steps, operations, elements, and/or components, but do not preclude the presence or addition of one or more other features, integers, steps, operations, elements, components, and/or groups thereof.

As used herein, the term “if” is, optionally, construed to mean “when” or “upon” or “in response to determining” or “in response to detecting,” depending on the context. Similarly, the phrase “if it is determined” or “if [a stated condition or event] is detected” is, optionally, construed to mean “upon determining” or “in response to determining” or “upon detecting [the stated condition or event]” or “in response to detecting [the stated condition or event],” depending on the context.

Additionally, while terms of ordinance or orientation may be used herein these elements should not be limited by these terms. All terms of ordinance or orientation, unless stated otherwise, are used for purposes distinguishing one element from another, and do not denote any particular order, order of operations, direction or orientation unless stated otherwise.

We claim:

1. A terminal assembly configured to terminate a shielded cable having an inner conductor, an inner insulator surrounding the inner conductor, an outer conductor surrounding the inner insulator, and an outer insulator surrounding the outer conductor, said terminal assembly comprising:

an outer ferrule formed of a conductive metallic material; and an inner ferrule formed of an elastomeric material having a Shore A durometer hardness between 50 and 80 and having an outer surface with a first diameter, wherein the inner ferrule has a plurality of circumferential grooves having a second diameter less than the first diameter defined in the outer surface, wherein the inner ferrule has a plurality of circumferential ribs having a third diameter greater than the first diameter projecting from said outer surface, wherein the at least a portion of the inner ferrule is disposed within the outer ferrule, wherein a portion of the outer conductor is disposed intermediate the inner ferrule and the outer ferrule and is in intimate contact therewith, and wherein the plurality of circumferential ribs define a convex rounded surface that is semicircular in cross section.

2. The terminal assembly according to claim 1, wherein one circumferential rib of the plurality of circumferential ribs is intermediate two adjacent circumferential grooves of the plurality of circumferential grooves.

3. The terminal assembly according to claim 2, wherein the one circumferential rib is adjacent one of the two circumferential grooves of the plurality of circumferential grooves and is separated from the other of the two circumferential grooves of the plurality of circumferential grooves.

4. The terminal assembly according to claim 2, wherein the one circumferential rib is adjacent the two circumferential grooves of the plurality of circumferential grooves.

5. The terminal assembly according to claim 1, wherein a floor of the plurality of circumferential grooves is perpendicular to side walls of the plurality of circumferential grooves.

6. The terminal assembly according to claim 1, wherein the elastomeric material is a silicone-based material.

7. The terminal assembly according to claim 1, wherein the outer ferrule is plastically deformed when crimped and wherein the inner ferrule is elastically deformed by the crimping of the outer ferrule.

8. A shielded cable assembly, comprising:

a shielded cable having an inner conductor, an inner insulator surrounding the inner conductor, an outer conductor surrounding the inner insulator, and an outer insulator surrounding the outer conductor; and the terminal assembly according to claim 1.

9. The terminal assembly according to claim 1, wherein the inner ferrule has a cylindrical shape.

10. The terminal assembly according to claim 1, wherein the outer ferrule has a cylindrical shape.

* * * * *